(12) United States Patent
Hotta et al.

(10) Patent No.: US 12,472,818 B2
(45) Date of Patent: Nov. 18, 2025

(54) VEHICLE DISPLAY CONTROL DEVICE, VEHICLE DISPLAY DEVICE, VEHICLE, VEHICLE DISPLAY CONTROL METHOD, AND NON-TRANSITORY STORAGE MEDIUM

(71) Applicant: TOYOTA JIDOSHA KABUSHIKI KAISHA, Toyota (JP)

(72) Inventors: Norihisa Hotta, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 18/142,633

(22) Filed: May 3, 2023

(65) Prior Publication Data

US 2024/0001762 A1   Jan. 4, 2024

(30) Foreign Application Priority Data

Jun. 29, 2022   (JP) .................................. 2022-104998

(51) Int. Cl.
*B60K 35/21*   (2024.01)
*B60K 35/23*   (2024.01)
*B60K 35/28*   (2024.01)
*B60K 35/29*   (2024.01)
*B60K 35/60*   (2024.01)

(52) U.S. Cl.
CPC .............. *B60K 35/21* (2024.01); *B60K 35/23* (2024.01); *B60K 35/28* (2024.01); *B60K 35/29* (2024.01); *B60K 35/60* (2024.01); *B60K 2360/166* (2024.01); *B60K 2360/1868* (2024.01); *B60K 2360/785* (2024.01)

(58) Field of Classification Search
CPC .. B60K 2360/785; B60K 35/00; B60K 35/21; B60K 35/28; B60K 35/23; B60K 2360/1868; B60K 2360/166; B60K 35/29; B60K 35/60
See application file for complete search history.

(56) References Cited

U.S. PATENT DOCUMENTS

| | | | |
|---|---|---|---|
| 10,235,122 B1* | 3/2019 | Goel | G06F 3/1423 |
| 2018/0157036 A1* | 6/2018 | Choi | G09G 3/001 |
| 2020/0393264 A1* | 12/2020 | Fukazawa | G01C 21/367 |
| 2022/0072958 A1* | 3/2022 | Shibata | B60K 35/81 |
| 2022/0276054 A1 | 9/2022 | Minamiguchi | |
| 2022/0388395 A1* | 12/2022 | Kim | B60K 35/10 |
| 2023/0058086 A1* | 2/2023 | Vassilovski | B60W 40/02 |
| 2023/0258465 A1* | 8/2023 | Zhou | G06F 9/451 |
| | | | 701/436 |
| 2023/0258466 A1* | 8/2023 | Lee | G01C 21/3617 |
| | | | 701/426 |
| 2023/0286509 A1* | 9/2023 | Kume | B60W 60/0051 |

(Continued)

FOREIGN PATENT DOCUMENTS

JP   2021-81370 A   5/2021

*Primary Examiner* — Andrea C Leggett
(74) *Attorney, Agent, or Firm* — Oliff PLC

(57) ABSTRACT

A vehicle display control device includes a memory and a processor coupled to the memory. The processor is configured to acquire an actual location of a vehicle, and change information displayed at a display region generated in front of an occupant, based on the actual location of the vehicle and based on a virtual location of the vehicle on a pre-generated map.

11 Claims, 10 Drawing Sheets

(56) References Cited

U.S. PATENT DOCUMENTS

2023/0304822 A1\* 9/2023 Lee .................... G01C 21/3635
2023/0356588 A1\* 11/2023 Oki ....................... B60K 35/00
2024/0377936 A1\* 11/2024 Vallet ................. G01C 21/3688

\* cited by examiner

VEHICLE DISPLAY CONTROL DEVICE, VEHICLE DISPLAY DEVICE, VEHICLE, VEHICLE DISPLAY CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2022-104998 filed on Jun. 29, 2022, the disclosure of which is incorporated by reference herein.

BACKGROUND

Technical Field

The present disclosure relates to a vehicle display control device, a vehicle display device, a vehicle, a vehicle display control method, and a non-transitory storage medium.

Related Art

For example, Japanese Patent Application Laid-Open (JP-A) No. 2021-081370 discloses an estimation device that includes: a dynamics model including a dynamic parameter that changes a behavior of a vehicle; a dead reckoning section that estimates a state quantity including a location of the vehicle by dead reckoning based on internal information acquired from an internal environment of the vehicle; a map matching section that observes a state quantity by map matching based on map information representing a travel environment of the vehicle and external information acquired from an external environment of the vehicle; and a parameter correction section that corrects a dynamic parameter that provides feed back to dead reckoning based on an offset amount in which the state quantity estimated by dead reckoning is offset with respect to the state quantity observed by map matching.

In the technology disclosed in Japanese Patent Application Laid-Open (JP-A) No. 2021-081370, although map matching is performed based on map information that specifies a travel environment for a vehicle and external information that is acquired from the external environment of the vehicle, in a case in which a location result of the vehicle is acquired as external information, a discrepancy may arise in the location of the detected vehicle.

In addition, in a case in which information corresponding to a detected location of a vehicle is displayed, if a discrepancy has arisen in a location of the detected vehicle, erroneous information may be displayed.

SUMMARY

The present disclosure provides a vehicle display control device, a vehicle display device, a vehicle, a vehicle display control method, and a non-transitory storage medium, which enable appropriate information to be displayed to an occupant in accordance with the accuracy of a detected location of the vehicle.

A vehicle display control device according to a first aspect includes: a location acquisition section configured to acquire an actual location of a vehicle; and a display changing section configured to change information displayed at a display region generated in front of an occupant, based on the actual location of the vehicle acquired by the location acquisition section and based on a virtual location of the vehicle on a pre-generated map.

According to the first aspect, the actual location of the vehicle is acquired by the location acquisition section, and the information displayed at the display region is changed by the display changing section based on the actual location of the vehicle and the virtual location of the vehicle on a pre-generated map. This enables appropriate information to be displayed to the occupant in accordance with the accuracy of the detected location of the vehicle.

A vehicle display control device according to a second aspect is the vehicle display control device according to the first aspect, wherein the display changing section is configured to change the information displayed at the display region in accordance with a degree of coincidence between the actual location of the vehicle and the virtual location of the vehicle.

According to the second aspect, the information displayed at the display region is changed in accordance with the degree of coincidence between the actual location of the vehicle and the virtual location of the vehicle, thereby enabling information in accordance with the accuracy of the detected location of the vehicle to be displayed.

A vehicle display control device according to a third aspect is the vehicle display control device according to the second aspect, wherein: in a case in which the degree of coincidence is equal to or greater than a predetermined degree of coincidence, the display changing section is configured to cause display of an image, via the display region, indicating a travel path at a travel path changing location; and in a case in which the degree of coincidence does not satisfy the predetermined degree of coincidence, the display changing section is configured to cause display, via the display region, of a remaining distance to the travel path changing location.

According to the third aspect, it is possible to prevent an image indicating a travel path from being displayed at an incorrect location in a case in which the accuracy of the detected location of the vehicle is low.

A vehicle display control device according to a fourth aspect includes: an acquisition section configured to acquire an accuracy of a detected location of a vehicle, which is derived based on an actual location of the vehicle and based on a virtual location of the vehicle on a pre-generated map; and an image changing section configured to change information displayed at a display region generated in front of an occupant, in accordance with the accuracy acquired by the acquisition section.

According to the fourth aspect, the acquisition section acquires the accuracy of the detected location of the vehicle, which is derived based on the actual location of the vehicle and the virtual location of the vehicle on the pre-generated map.

The display changing section then changes the information displayed at the display region in accordance with the accuracy of the detected location of the vehicle. This enables appropriate information to be displayed to the occupant in accordance with the accuracy of the detected location of the vehicle.

A vehicle display device according to a fifth aspect includes: the vehicle display control device according to any one of the first aspect to the fourth aspect; and a display section that is configured to cause display of the information changed by the display changing section, at the display region.

According to the fifth aspect, it is possible to provide a vehicle display device that enables appropriate information to be displayed to the occupant in accordance with the accuracy of the detected location of the vehicle.

A vehicle according to a sixth aspect includes: the vehicle display control device according to any one of the first aspect to the fourth aspect; and a display section that is configured to cause display of the information changed by the display changing section, at the display region.

According to the sixth aspect, it is possible to provide a vehicle that enables information to be displayed to the occupant in accordance with the accuracy of the detected location of the vehicle.

A vehicle display control method according to a seventh aspect includes, by a processor: acquiring an actual location of a vehicle; and performing processing to change information displayed at a display region generated in front of an occupant, based on the actual location of the vehicle and based on a virtual location of the vehicle on a pre-generated map.

According to the seventh aspect, it is possible to provide a vehicle display control method that enables information to be displayed to the occupant in accordance with the accuracy of the detected location of the vehicle.

A non-transitory storage medium according to an eighth aspect is executable by a processor to perform processing, the processing including: acquiring an actual location of a vehicle; and changing information displayed at a display region generated in front of an occupant, based on the actual location of the vehicle and based on a virtual location of the vehicle on a pre-generated map.

According to the eighth aspect, it is possible to provide a non-transitory storage medium that enables information to be displayed to the occupant in accordance with the accuracy of the detected location of the vehicle.

As described above, according to the present disclosure it is possible to provide a vehicle display control device, a vehicle display device, a vehicle, a vehicle display control method, and a non-transitory storage medium which enable information to be displayed to the occupant in accordance with the accuracy of the detected location of the vehicle.

BRIEF DESCRIPTION OF THE DRAWINGS

Exemplary embodiments of the present invention will be described in detail based on the following figures, wherein.

DETAILED DESCRIPTION

Figure 1:
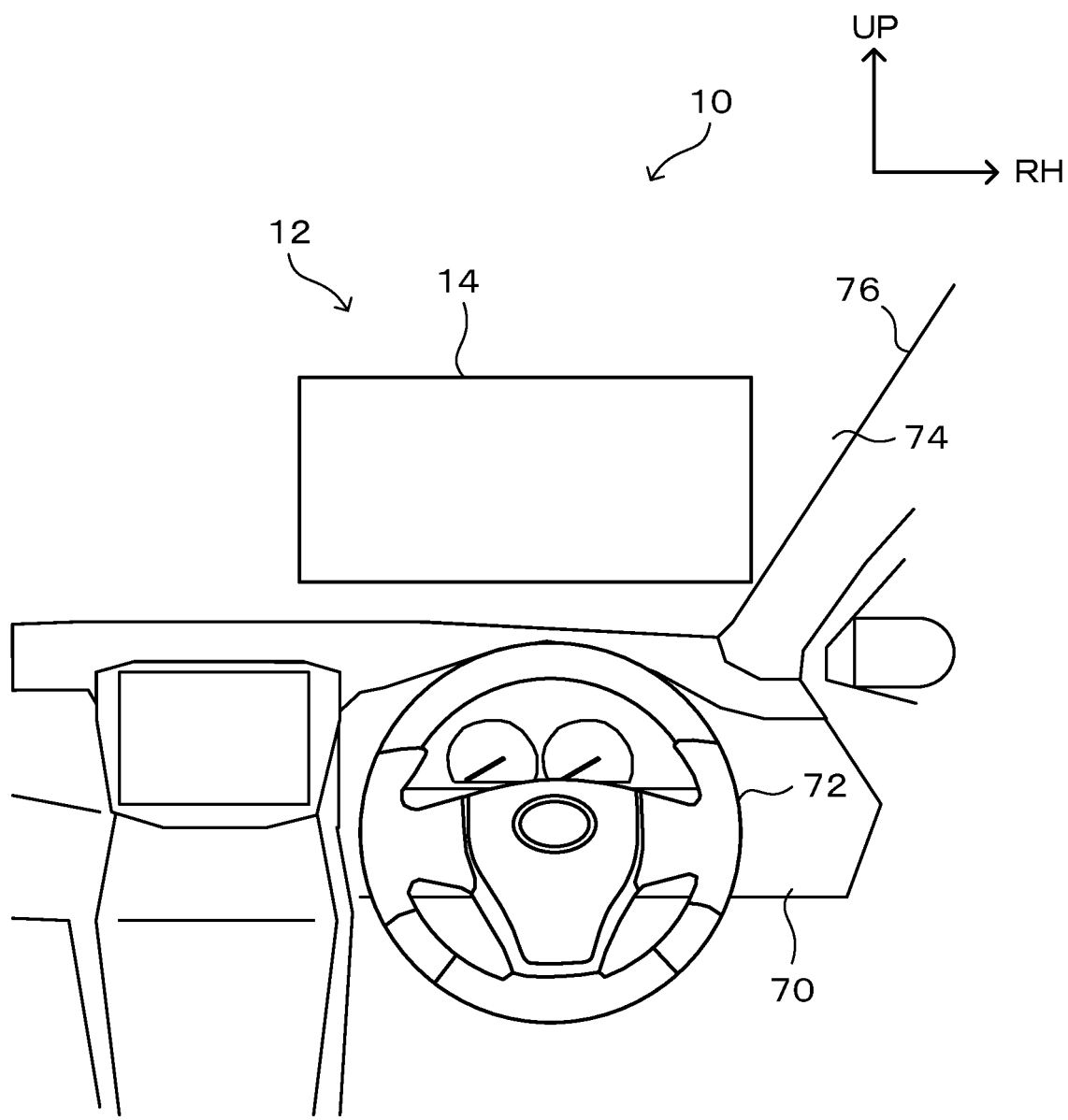
FIG. 1 is a diagram illustrating a schematic configuration of a vehicle display device according to the present exemplary embodiment.

Detailed explanation follows of an example of an exemplary embodiment of the present disclosure, with reference to the drawings. FIG. 1 is a diagram illustrating a schematic configuration of a vehicle display device according to the present exemplary embodiment. Note that the arrow UP illustrated in FIG. 1 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

As illustrated in FIG. 1, an instrument panel 70 is provided at a front part inside a vehicle cabin of a vehicle 10. The instrument panel 70 extends in the vehicle width direction, and a steering wheel 72 is provided at a vehicle right side of the instrument panel 70. Namely, in the present exemplary embodiment, as an example, a right hand drive vehicle is configured with a steering wheel 72 provided on the right side, and a driver's seat is installed on the right side of the vehicle.

A windshield glass 74 is provided at a front end part of the instrument panel 70. The windshield glass 74 extends in the vehicle vertical direction and the vehicle width direction to partition the vehicle cabin interior from an exterior of the vehicle cabin.

A vehicle right side end part of the windshield glass 74 is fixed to a front pillar 76 on the vehicle right side. The front pillar 76 extends in the vehicle vertical direction, and the windshield glass 74 is fixed to an inner side end part of the front pillar 76 in the vehicle width direction. Note that a vehicle left side end part of the windshield glass 74 is fixed to a front pillar (not shown) on the left side of the vehicle.

The windshield glass 74 is provided with a display region 14 that displays an image in front of an occupant. The display region 14 is a projection plane on which an image is projected by a display section 18 (see FIG. 2). Namely, the display section 18 is a head-up display device provided at a vehicle front side of the instrument panel 70. It is configured such that an image is projected from the display section 18, which is the head-up display device, onto the display region 14 of the windshield glass 74.

Figure 2:
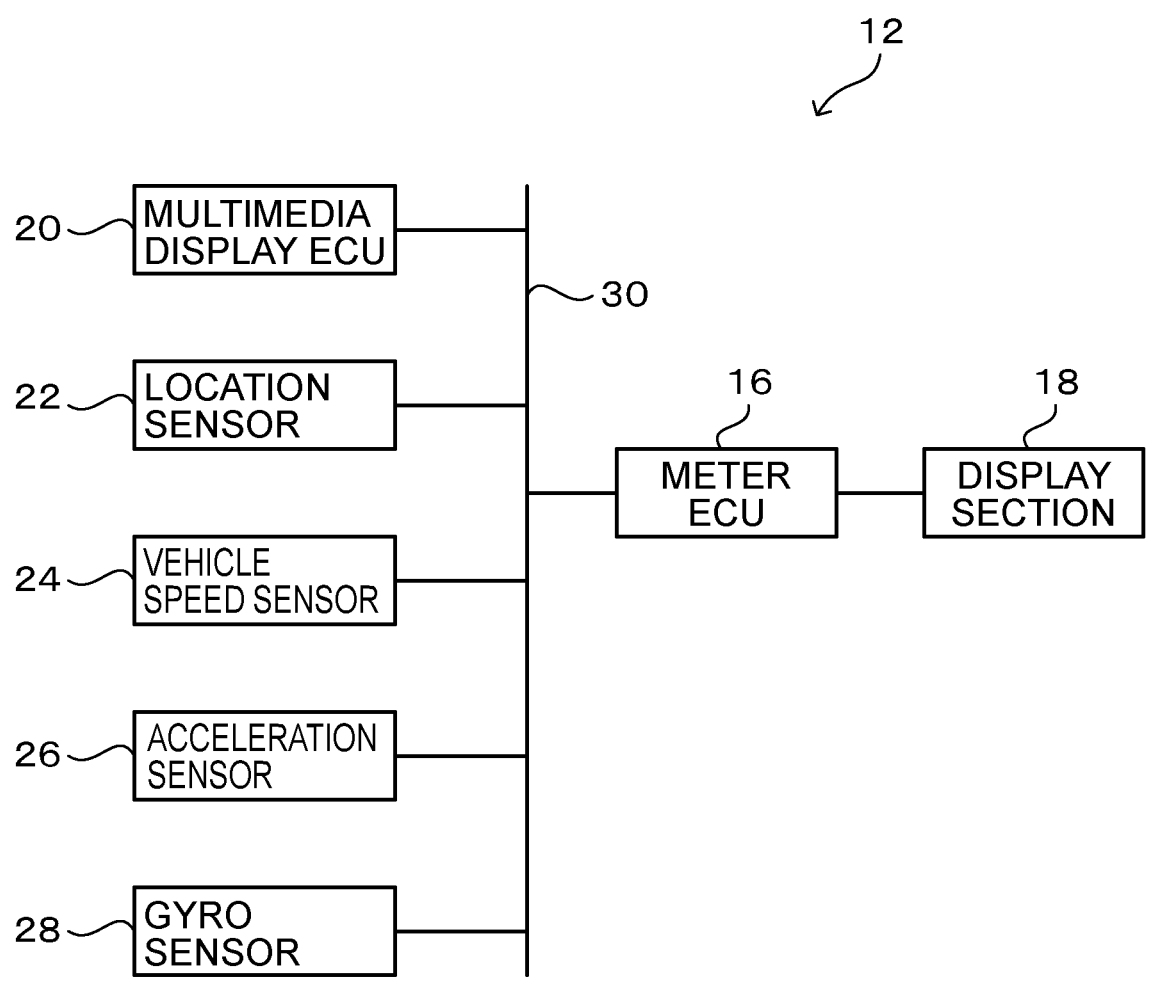
FIG. 2 is a block diagram illustrating a configuration of a control system of a vehicle display device according to the present exemplary embodiment.

Next, explanation follows regarding a configuration of a control system of a vehicle display device 12 according to the present exemplary embodiment. FIG. 2 is a block diagram illustrating a configuration of a control system of the vehicle display device 12 according to the present exemplary embodiment.

The vehicle display device 12 according to the present exemplary embodiment includes a meter electronic control unit (ECU) 16, a location sensor 22, a vehicle speed sensor 24, an acceleration sensor 26, a gyro sensor 28, and a multimedia display ECU 20, each of which is connected to a vehicle network 30.

The display section 18 is connected to the meter ECU 16, the meter ECU 16 controlling the display section 18 to display an image at the display region 14.

For example, the location sensor 22 receives, from plural global navigation satellite system (GNSS) satellites, a GNSS signal including time information to measure the location of the vehicle 10.

The vehicle speed sensor 24 detects a vehicle speed, the acceleration sensor 26 detects acceleration generated at the vehicle 10, and the gyro sensor 28 detects a change in circumrotation, direction, or the like of the vehicle 10 as an angular velocity. Note that a yaw rate sensor may be applied instead of the gyro sensor 28, or a configuration may further include a yaw rate sensor.

The multimedia display ECU 20 has the functionality of a navigation device that performs guidance display to a preset destination based on detection results from respective sensors such as the location sensor 22, the vehicle speed sensor 24, the acceleration sensor 26, and the gyro sensor 28. The multimedia display ECU 20 determines a relative trajectory of the vehicle 10 based on the detection results of the respective sensors, and performs processing such as map matching with a pre-generated map.

Figure 3:
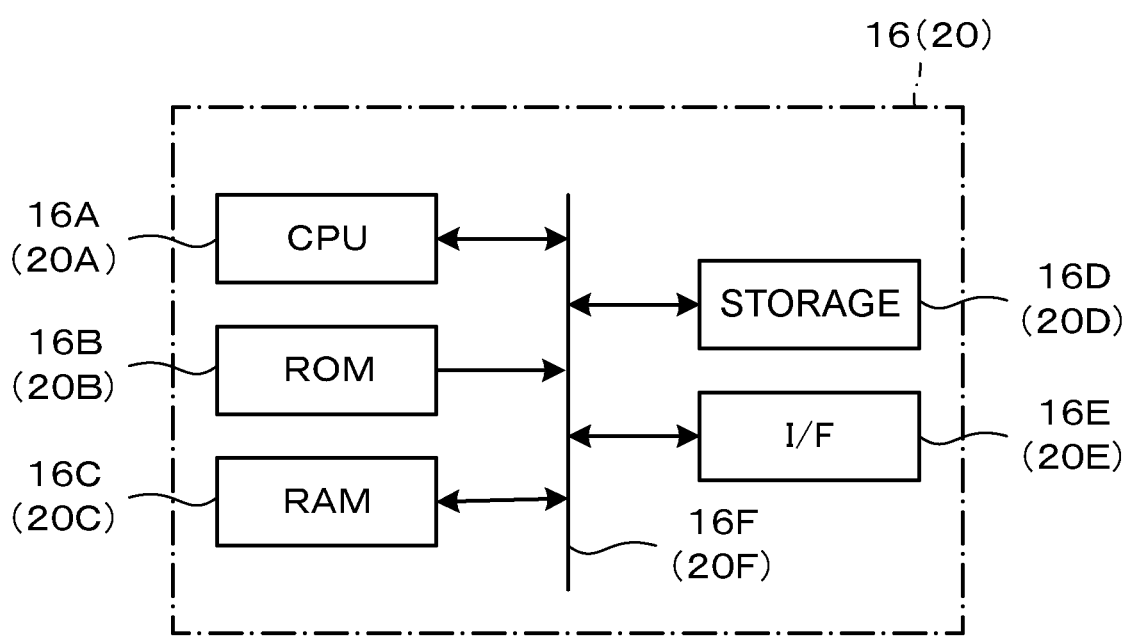
FIG. 3 is a block diagram illustrating a configuration of the main components of an electrical system of a meter ECU and a multimedia display ECU in a vehicle display device according to the present exemplary embodiment.

FIG. 3 is a block diagram illustrating the main components of the electrical system of the meter ECU 16 and the multimedia display ECU 20 in the vehicle display device 12 according to the present exemplary embodiment. Note that since the meter ECU 16 and the multimedia display ECU 20 are basically configured by a general computer, explanation follows regarding the meter ECU 16 as a representative thereof.

The meter ECU 16 is configured by a general microcomputer including a central processing unit (CPU) 16A, read only memory (ROM) 16B, random access memory (RAM) 16C, storage 16D, an interface (I/F) 16E, a bus 16F, and the like.

The CPU 16A is a central processing unit that executes various programs to control overall operation of the device. The ROM 16B stores various control programs, various parameters, and the like in advance. The RAM 16C is used as a work area and the like during execution of various programs by the CPU 16A. The storage 16D is configured by various storage sections such as a hard disk drive (HDD), a solid state drive (SSD), and flash memory, and stores various data, application programs, and the like. The I/F 16E is connectable to the vehicle network 30, and transmits and receives various data to and from other ECUs such as the meter ECU 16 connected to the vehicle network 30. The respective components of the meter ECU 16 described above are electrically connected to each other via a bus 161.

Figure 4:
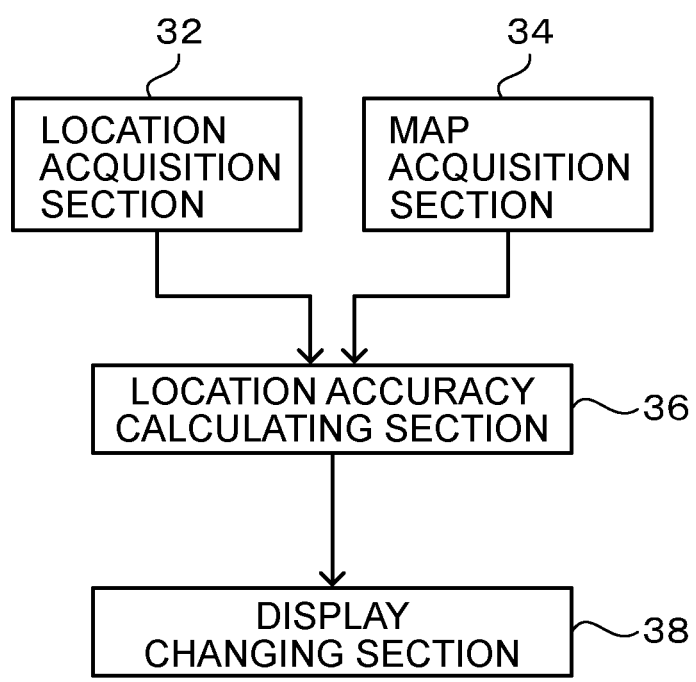
FIG. 4 is a functional block diagram illustrating a functional configuration of the meter ECU and the multimedia display ECU.

Next, explanation follows regarding a functional configuration in which the CPU 16A, serving as a processor of the meter ECU 16, and the CPU 20A, serving as a processor of the multimedia display ECU 20, execute a program stored in the ROM 16B, serving as memory, and the ROM 20B, serving as memory. FIG. 4 is a functional block diagram illustrating a functional configuration of the meter ECU 16 and the multimedia display ECU 20.

The multimedia display ECU 20 has functionality of a location acquisition section 32, a map acquisition section 34, and a location accuracy calculating section 36, while the meter ECU 16 has functionality of a display changing section 38. Note that there are cases in which the multimedia display ECU 20 and the meter ECU 16 correspond to a vehicle display control device, and cases in which the meter ECU 16 corresponds to a vehicle display control device.

The location acquisition section 32 acquires the detection results of the respective sensors, namely the location sensor 22, the vehicle speed sensor 24, the acceleration sensor 26, and the gyro sensor 28, as location information for the vehicle 10, and outputs this to the location accuracy calculating section 36.

The map acquisition section 34 acquires map information generated in advance and stored in the storage 20D or the like, and outputs this to the location accuracy calculating section 36. Note that the map information may be stored outside the map server or the like and the map information may be acquired from the outside.

The location accuracy calculating section 36 determines a relative trajectory of the vehicle 10 based on the location information for the vehicle 10 acquired by the location acquisition section 32 and the map information acquired by the map acquisition section 34. The location accuracy calculating section 36 then uses the location information for the vehicle 10 and the map information to perform map matching to align the location of the vehicle 10 on the map to estimate the location of the vehicle 10, and also calculates the accuracy of the detected location of the vehicle 10. The accuracy of the detected location corresponds to a degree of coincidence between the actual location of the vehicle 10 and the virtual location of the vehicle 10 on the map, and is calculated based on the actual location of the vehicle 10 detected by the location sensor 22 and the virtual location of the vehicle 10 on the map. As the accuracy of the calculated detected location of the vehicle 10, for example, map matching accuracy, horizontal dilution of precision, and vertical dilution of precision are calculated using well-known technology.

Figure 5:
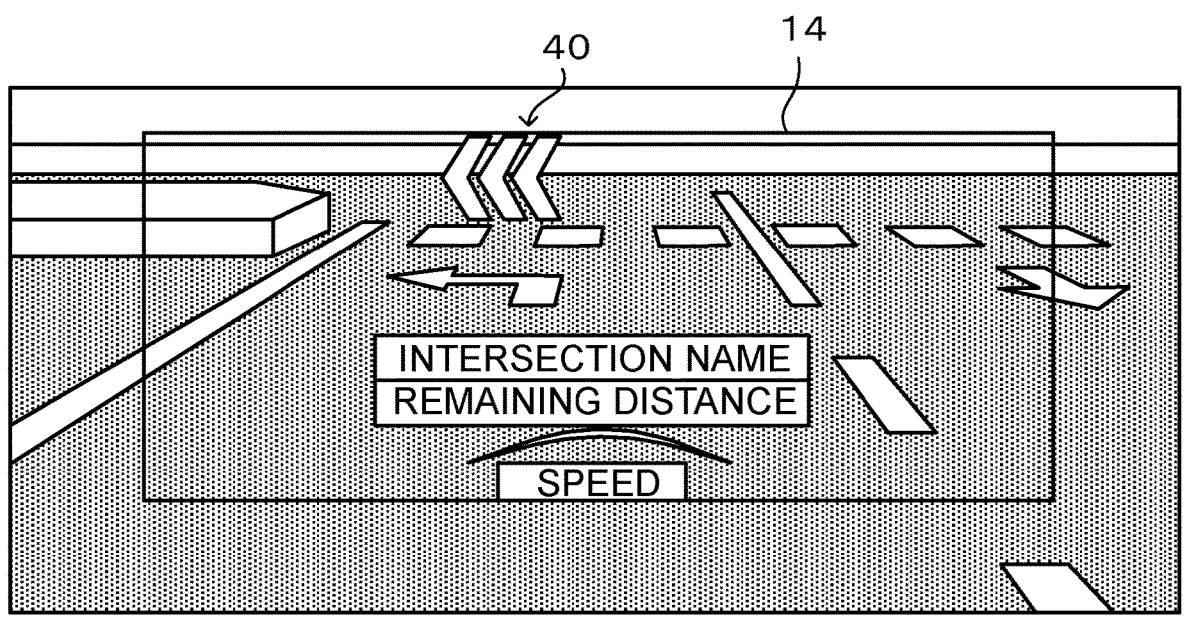
FIG. 5 is a diagram illustrating an example of displaying an arrow image at a display region.

The display changing section 38 performs processing to change information displayed at the display region 14 by the display section 18 in accordance with the accuracy of the detected location calculated by the location accuracy calculating section 36. In the present exemplary embodiment, in a case in which each of the map matching accuracy, the horizontal dilution of precision, and the vertical dilution of precision is equal to or greater than a predetermined accuracy, as illustrated in FIG. 5, an arrow image 40 is displayed as an image, via the display region 14, indicating a travel path at the travel path changing location. Further, as illustrated in FIG. 5, other than the arrow image 40, the name of an intersection, the remaining distance to the intersection, which is the travel path changing location, the speed, and the like may be displayed. Note that in a case in which, for example, an intersection is recognized by image recognition based on a captured image capturing ahead of the vehicle by a camera or the like and the guidance intersection is within the angle of view, the arrow image 40 may be configured to be displayed at the display region 14.

Figure 6:
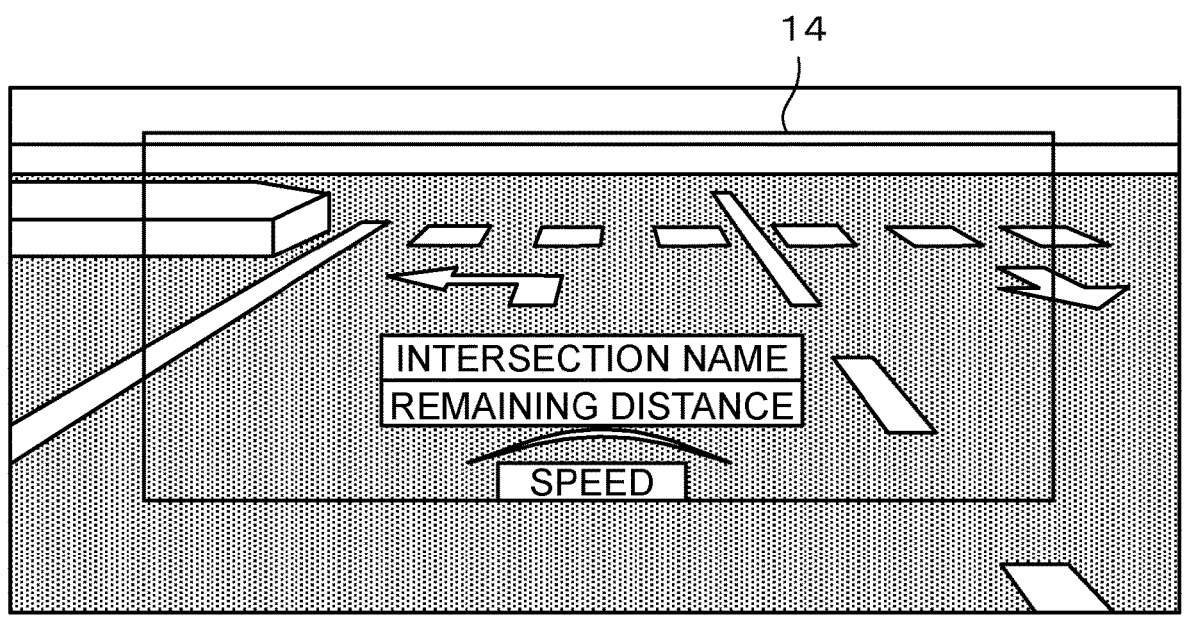
FIG. 6 is a diagram illustrating an example in which an arrow image is not displayed but a remaining distance to a travel path changing location is displayed at a display region.

On the other hand, in a case in which any one of the map matching accuracy, the horizontal dilution of precision or the vertical dilution of precision is less than a predetermined accuracy, as illustrated in FIG. 6, the arrow image 40 is not displayed, and the remaining distance to the travel path changing location is displayed at the display region 14. As illustrated in FIG. 6, other than the remaining distance to the travel path changing location, the name of the intersection and the speed may be displayed.

Next, explanation follows regarding processing performed by the multimedia display ECU 20 and the meter ECU 16 of the vehicle display device 12 according to the present exemplary embodiment configured as described above.

Figure 7:
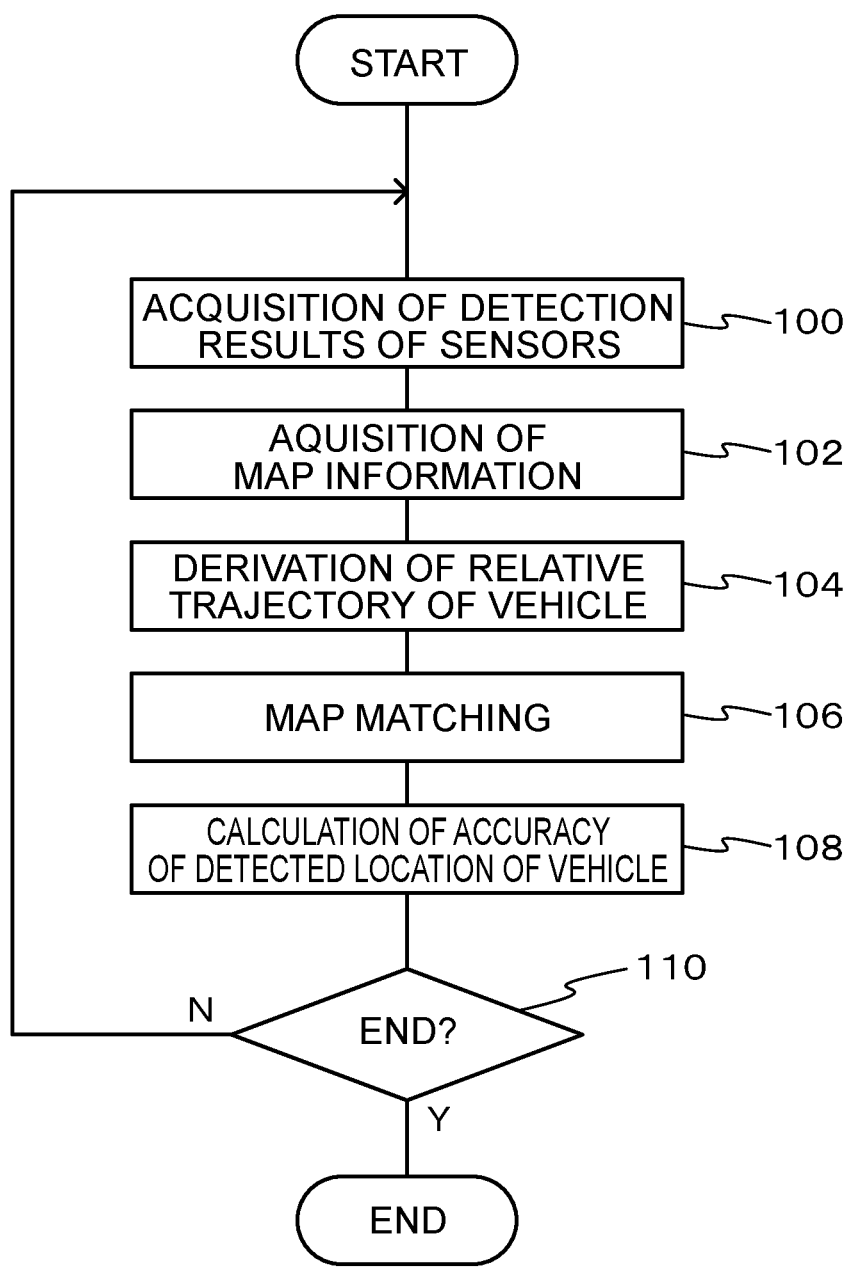
FIG. 7 is a flowchart illustrating an example of a flow of processing performed by the multimedia display ECU of the vehicle display device according to the present exemplary embodiment.

First, explanation follows regarding processing performed by the multimedia display ECU 20. FIG. 7 is a flowchart illustrating an example of a flow of processing performed by the multimedia display ECU 20 of the vehicle display device 12 according to the present exemplary embodiment. Note that the processing of FIG. 7 is started, for example, in a case in which a non-illustrated ignition switch is turned on.

At step 100, the CPU 20A acquires the detection results of the sensors, and transitions to step 102. Namely, the location acquisition section 32 acquires the detection results of the respective sensors, namely the location sensor 22, the vehicle speed sensor 24, the acceleration sensor 26, and the gyro sensor 28 as information that detects the location of the vehicle 10.

At step 102, the CPU 20A acquires map information, and transitions to step 104. Namely, the map acquisition section 34 acquires map information generated in advance and stored in the storage 20D or the like. As the acquired map information, map information over a predetermined range including the location of the vehicle 10 detected by the location sensor 22 is acquired.

At step 104, the CPU 20A derives a relative trajectory of the vehicle 10, and transitions to step 106. Namely, the location accuracy calculating section 36 determines the relative trajectory of the vehicle 10 based on the location information for the vehicle 10 acquired by the location acquisition section 32 and the map information acquired by the map acquisition section 34.

At step 106, the CPU 20A performs map matching, and transitions to step 108. Namely, the location accuracy calculating section 36 performs map matching to align the location of the vehicle 10 on the map using the information that detects the location of the vehicle 10 and the map information.

At step 108, the CPU 20A calculates the accuracy of the detected location of the vehicle 10, and transitions to step 110. Namely, the location accuracy calculating section 36 calculates the map matching accuracy, the horizontal dilution of precision, and the vertical dilution of precision using well-known technology.

At step 110, the CPU 20A determines whether or not to end the processing. This determination determines, for example, whether or not the non-illustrated ignition switch has been turned off, whether or not an operation to turn off map display has been performed, or the like. In a case in which the determination is negative, the processing returns to step 100 to repeat the above-described processing, while in a case in which the determination is affirmative, the sequence of processing is ended.

Figure 8:
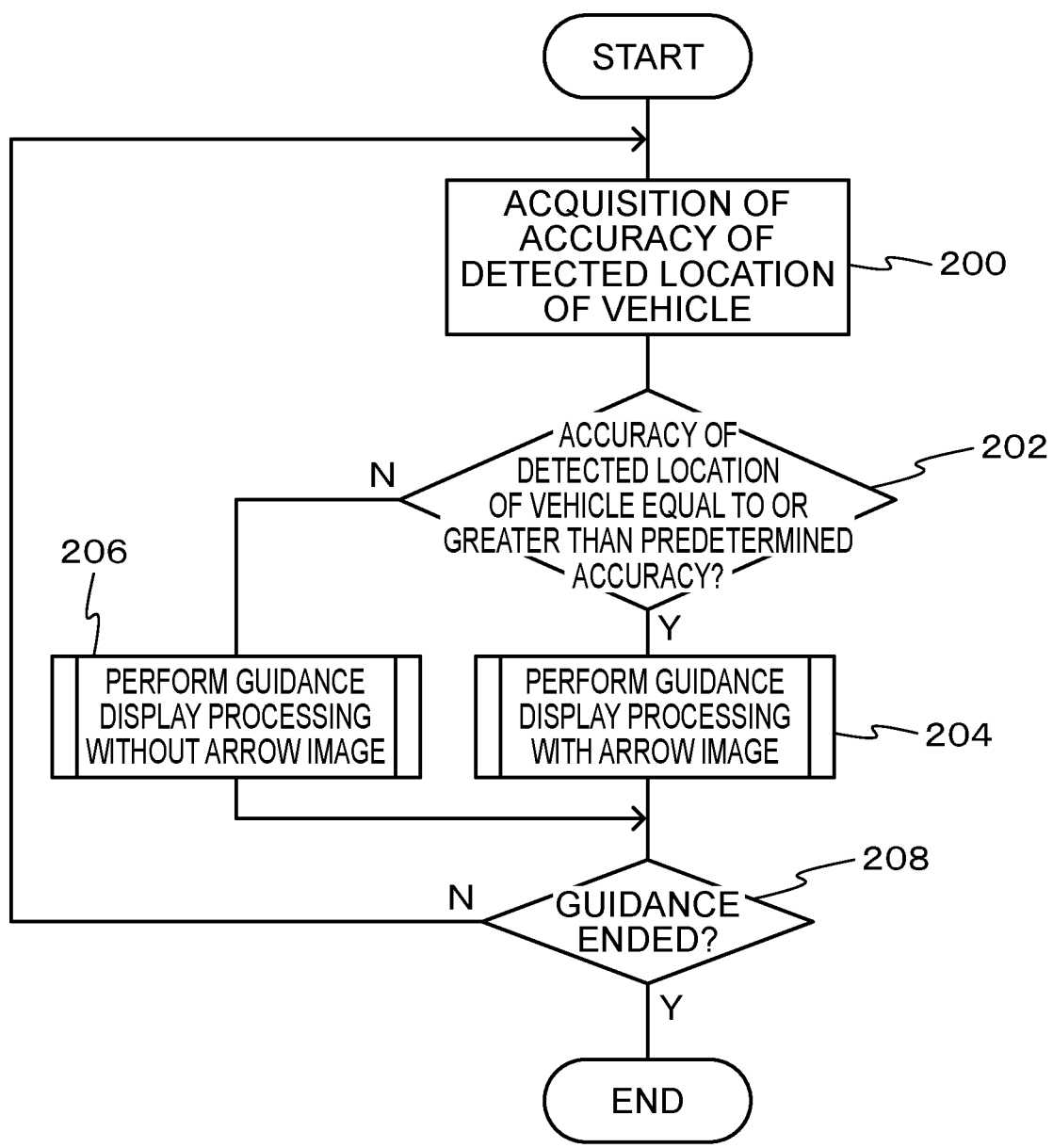
FIG. 8 is a flowchart illustrating an example of a flow of processing performed by the meter ECU of the vehicle display device according to the present exemplary embodiment.

Next, explanation follows regarding processing performed by the meter ECU 16. FIG. 8 is a flowchart illustrating an example of a flow of processing performed by the meter ECU 16 of the vehicle display device 12 according to the present exemplary embodiment. Note that the processing illustrated in FIG. 8 is performed in a case in which, for example, a destination has been set and guidance has been started by an occupant of the vehicle 10.

At step 200, the CPU 16A acquires the accuracy of the detected location of the vehicle 10, and transitions to step 202. Namely, the accuracy of the detected location of the vehicle 10 calculated by the multimedia display ECU 20 at above-described step 108 is acquired, and the processing proceeds to step 202. Note that step 200 corresponds to the acquisition section.

At step 202, the CPU 16A determines whether or not the accuracy of the detected location of the vehicle 10 is equal to or greater than a predetermined accuracy. This determination is performed by the display changing section 38 determining whether or not each of the map matching accuracy, the horizontal dilution of precision, and the vertical dilution of precision is equal to or greater than a predetermined accuracy. In a case in which the determination is affirmative, the processing transitions to step 204, while in a case in which any of these is less than a predetermined accuracy, the determination is negative, and the processing transitions to step 206.

At step 204, the CPU 16A performs guidance display processing including an arrow image 40, and transitions to step 208. For example, as illustrated in FIG. 5, the arrow image is displayed, via the display region 14, as an image indicating a travel path at the travel path changing location. This enables the arrow image 40 to be displayed superimposed on an actual travel path changing location such as an intersection, enabling the location of the arrow image 40 to be recognized as the travel path changing location.

At step 206, the CPU 16A performs guidance display processing without an arrow image, and transitions to step 208. For example, as illustrated in FIG. 6, the arrow image 40 is not displayed, and the remaining distance to the travel path changing location is displayed at the display region 14. This enables the arrow image 40 to be prevented from being displayed at an incorrect location in a case in which the accuracy of the detected location of the detected vehicle 10 is less than a predetermined accuracy.

At step 208, the CPU 16A determines whether or not guidance has ended. In a case in which the determination is negative, the processing returns to step 200 and the above-described processing is repeated, while the sequence of processing is ended at a point at which the determination is affirmative.

As described above, the meter ECU 16 performs processing to change information displayed at the display region 14 by the display section 18 in accordance with the accuracy of the detected location of the vehicle 10 calculated by the multimedia display ECU 20. This enables appropriate information to be displayed to the occupant in accordance with the accuracy of the detected location of the vehicle.

More specifically, in a case in which the accuracy of the detected location of the vehicle 10 is equal to or greater than a predetermined accuracy, the arrow image 40 is displayed at the display region 14, and in a case in which the accuracy of the detected location of the vehicle 10 is less than the predetermined accuracy, the remaining distance to the travel path changing location is displayed without displaying the arrow image 40, thereby making it is possible to prevent the arrow image 40 from being displayed at an incorrect location in a case in which the accuracy of the detected location of the vehicle 10 is low.

Although an example in which whether the arrow image 40 is displayed or not displayed is changed in accordance with the accuracy of the detected location of the vehicle 10 has been explained in the above-described exemplary embodiment, there is no limitation to changing the image to be displayed. For example, in a case in which the accuracy of the detected location of the vehicle 10 is equal to or greater than a predetermined accuracy, the arrow image 40 may be displayed at the display region 14 in a similar manner to the above-described exemplary embodiment, while in a case in which the accuracy of the detected location of the vehicle 10 is less than a predetermined accuracy, a simplified map image 42 may be displayed at the display region 14 as illustrated in FIG. 9.

Figure 9:
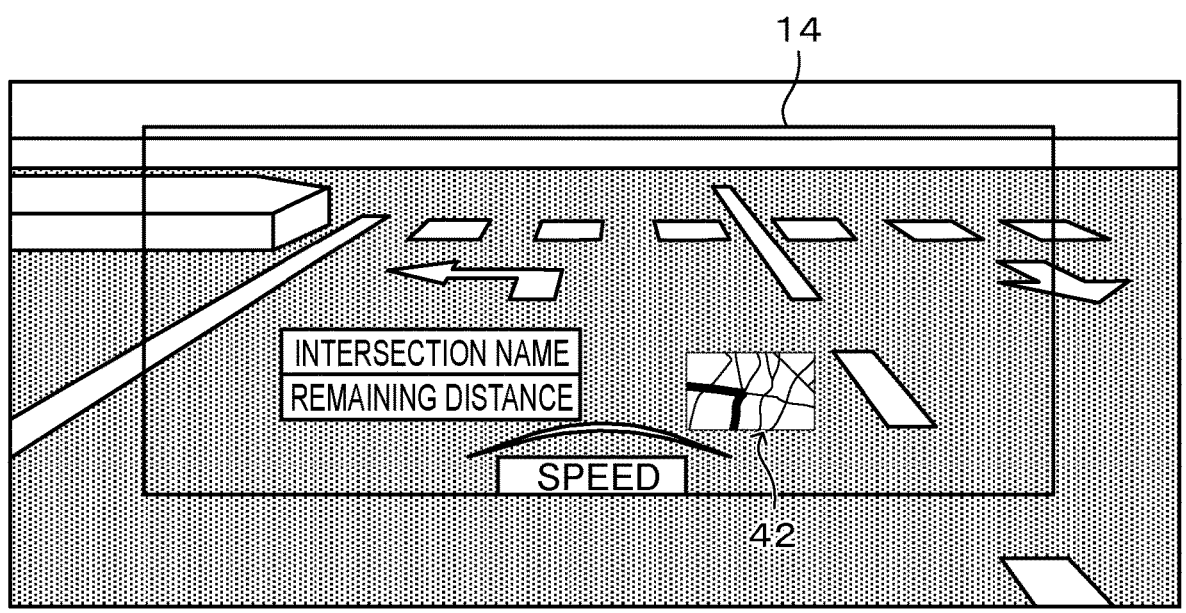
FIG. 9 is a diagram illustrating an example of displaying a simplified map image.

Alternatively, plural threshold values for the accuracy of the detected location of the vehicle 10 may be provided, and for example, the display illustrated in FIG. 5, FIG. 6, or FIG. 9 may be changed. In a case in which the displays of FIG. 5, FIG. 6, and FIG. 9 are used, for example, the display of the arrow image 40 of FIG. 5, the display of the simplified map image 42 of FIG. 9, and the display of the remaining distance of FIG. 6 may be changed in order of increasing accuracy of the detected location of the vehicle 10.

Although explanation has been given regarding an example in which the information displayed at the display region 14 is changed in accordance with the degree of coincidence between the actual location of the vehicle 10 and the virtual location of the vehicle 10 on the map in the above-described exemplary embodiment, there is no limitation thereto. For example, the information displayed at the display region 14 may be changed in accordance with the distance between the virtual location of the vehicle 10 on the map and the actual location of the vehicle 10. More specifically, in a case in which the distance between the actual location of the vehicle 10 and the virtual location of the vehicle 10 is less than a predetermined threshold value, the arrow image 40 may be displayed, and in a case in which the distance between the actual location of the vehicle 10 and the virtual location of the vehicle 10 is equal to or larger than the threshold value, at least one of the remaining distance to the travel path changing location or the simplified map 42 may be displayed.

Further, although an example in which the two ECUs, namely the multimedia display ECU 20 and the meter ECU 16, perform the processing illustrated in FIG. 7 and FIG. 8 has been explained in the above-described exemplary embodiment, the number of ECUs is not limited to two. For example, one ECU may perform the processing of FIG. 7 or FIG. 8, or three or more ECUs may perform the processing in a coordinated manner.

Figure 10:
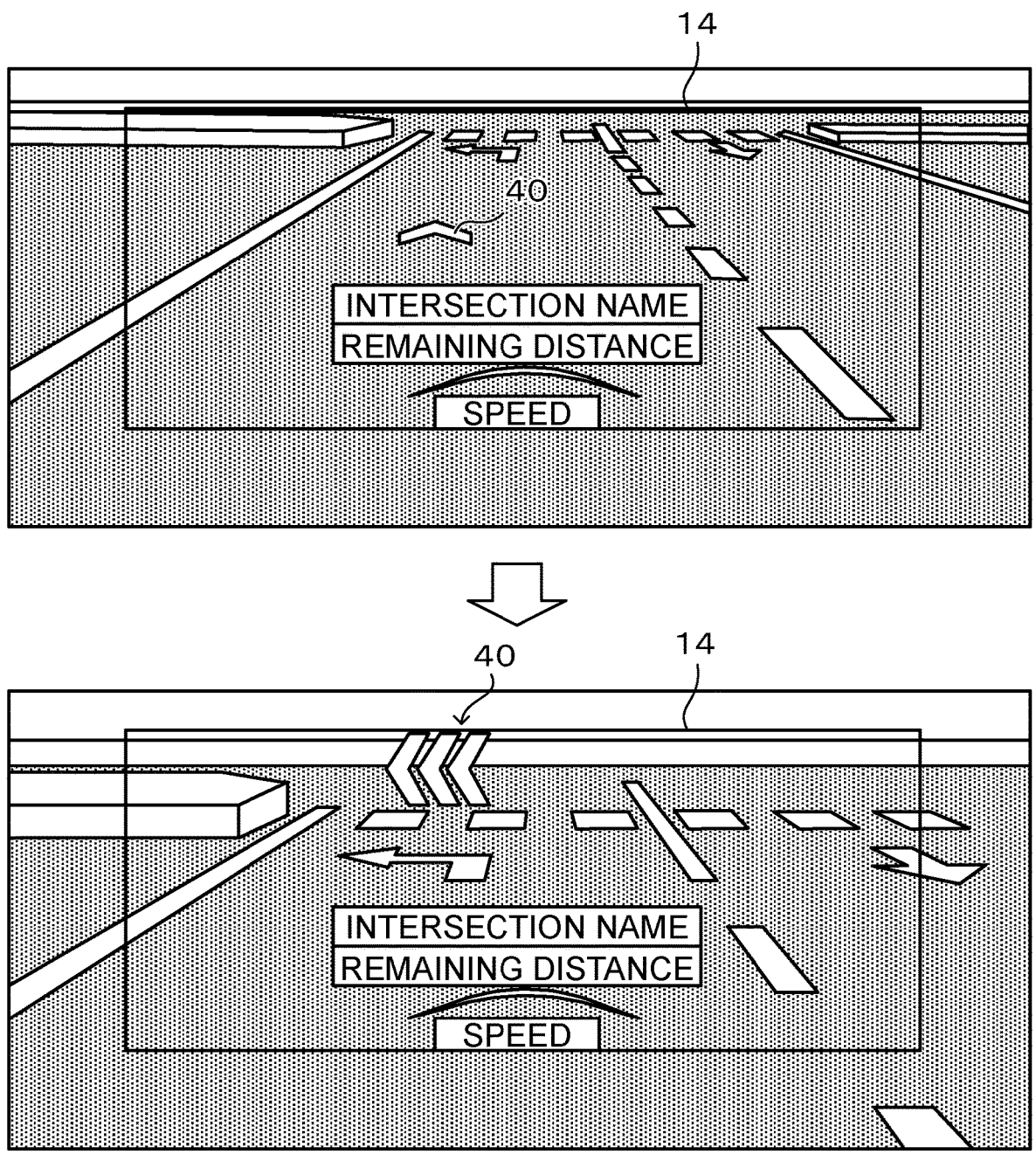
FIG. 10 is a diagram illustrating an example in which an arrow image is displayed so as to move toward a travel path changing location, and then when the travel path changing location is within the angle of view, the arrow image is displayed at the travel path changing location.

Furthermore, although an example in which the arrow image 40 is displayed at the travel path changing location has been explained in the-described above exemplary embodiment, there is no limitation thereto. For example, as illustrated in FIG. 10, after the arrow image 40 is displayed so as to move toward the travel path changing location, the arrow image 40 may be displayed at the travel path changing location when the travel path changing location is within the angle of view.

In addition, although explanation has been given regarding processing performed by the multimedia display ECU 20 and the meter ECU 16 in the above-described exemplary embodiment as software processing performed by executing a program, there is no limitation thereto. For example, the processing may be performed using hardware such as a graphics processing unit (GPU), an application specific integrated circuit (ASIC), or a field-programmable gate array (FPGA). Alternatively, both software and hardware may be combined in processing. In a case in which software processing is employed, the programs may be stored and distributed on various non-transitory storage media.

Moreover, the present disclosure is not limited to the above descriptions, and obviously various other modifications may be implemented within a range that does not depart from the gist of the present disclosure.

What is claimed is:

1. A vehicle display control device configured to control a head-up display of a vehicle, the head-up display projecting images onto a windshield of the vehicle at a display region located in front of an occupant of the vehicle, the vehicle display control device comprising:

a memory; and a processor coupled to the memory, the processor being configured to:

acquire an accuracy of a detected location of the vehicle, the accuracy being derived from (i) an actual location of the vehicle obtained by a location sensor and (ii) a virtual location of the vehicle on a trajectory on a pre-generated map;

in a case in which the accuracy is equal to or greater than a predetermined accuracy, cause the head-up display to display, at the display region on the windshield in front of the occupant of the vehicle, an arrow image including one or more arrows and indicating a direction of a travel path that is to be taken by the vehicle at a travel path changing location that is ahead of the vehicle and viewed through the windshield within the display region in front of the occupant of the vehicle; and in a case in which the accuracy is less than the predetermined accuracy, cause the head-up display to display, at the display region on the windshield in front of the occupant of the vehicle, a remaining distance between the vehicle and the travel path changing location while not displaying the arrow image.

2. A vehicle display device, comprising:

the vehicle display control device according to claim 1; and the head-up display that is configured to project the images onto the windshield at the display region.

3. A vehicle comprising:

the vehicle display control device according to claim 1; and the head-up display that is configured to project the images onto the windshield of the vehicle at the display region.

4. The vehicle display control device according to claim 1, wherein the arrow image is displayed superimposed on the travel path changing location that is viewed through the windshield within the display region.

5. The vehicle display control device according to claim 1, wherein, in the case in which the accuracy is less than the predetermined accuracy, a simplified map image is displayed at the display region.

6. A vehicle display control method executed by a processor configured to control a head-up display of a vehicle, the head-up display projecting images onto a windshield of the vehicle at a display region located in front of an occupant of the vehicle, the display control method comprising:

acquiring an accuracy of a detected location of the vehicle, the accuracy being derived from (i) an actual location of the vehicle obtained by a location sensor and (ii) a virtual location of the vehicle on a trajectory on a pre-generated map;

in a case in which the accuracy is equal to or greater than a predetermined accuracy, causing the head-up display to display, at the display region on the windshield in front of the occupant of the vehicle, an arrow image including one or more arrows and indicating a direction of a travel path that is to be taken by the vehicle at a travel path changing location that is ahead of the vehicle and viewed through the windshield within the display region in front of the occupant of the vehicle; and in a case in which the accuracy is less than the predetermined accuracy, causing the head-up display to display, at the display region on the windshield in front of the occupant of the vehicle, a remaining distance between the vehicle and the travel path changing location while not displaying the arrow image.

7. The vehicle display control method according to claim 6, wherein the arrow image is displayed superimposed on the travel path changing location that is viewed through the windshield within the display region.

8. The vehicle display control method according to claim 6, further comprising:
   in the case in which the accuracy is less than the predetermined accuracy, displaying a simplified map image at the display region.

9. A non-transitory storage medium storing a program executable by a processor to perform vehicle display control processing of a head-up display of a vehicle, the head-up display projecting images onto a windshield of the vehicle at a display region located in front of an occupant of the vehicle, the vehicle display control processing comprising:
   acquiring an accuracy of a detected location of the vehicle, the accuracy being derived from (i) an actual location of the vehicle obtained by a location sensor and (ii) a virtual location of the vehicle on a trajectory on a pre-generated map;
   in a case in which the accuracy is equal to or greater than a predetermined accuracy, causing the head-up display to display, at the display region on the windshield in front of the occupant of the vehicle, an arrow image including one or more arrows and indicating a direction of a travel path that is to be taken by the vehicle at a travel path changing location that is ahead of the vehicle and viewed through the windshield within the display region in front of the occupant of the vehicle; and
   in a case in which the accuracy is less than the predetermined accuracy, causing the head-up display to display, at the display region on the windshield in front of the occupant of the vehicle, a remaining distance between the vehicle and the travel path changing location while not displaying the arrow image.

10. The non-transitory storage medium according to claim 9, wherein the vehicle display control processing includes displaying the arrow image superimposed on the travel path changing location that is viewed through the windshield within the display region.

11. The non-transitory storage medium according to claim 9, wherein the vehicle display control processing further comprises:
   in the case in which the accuracy is less than the predetermined accuracy, displaying a simplified map image at the display region.

* * * * *